(12) United States Patent
Blais et al.

(10) Patent No.: US 6,524,843 B1
(45) Date of Patent: Feb. 25, 2003

(54) PROCESS AND APPARATUS FOR THE TREATMENT OF CARBON DIOXIDE WITH CARBONIC ANHYDRASE

(75) Inventors: Réjean Blais, Lévis (CA); Peter Rogers, Sillery (CA)

(73) Assignee: CO2 Solution Inc., Val Belair (CA)

( * ) Notice: Subject to any disclaimer, the term of this patent is extended or adjusted under 35 U.S.C. 154(b) by 0 days.

(21) Appl. No.: 09/424,852

(22) PCT Filed: Jun. 2, 1998

(86) PCT No.: PCT/CA98/00541

§ 371 (c)(1),
(2), (4) Date: Dec. 6, 1999

(87) PCT Pub. No.: WO98/55210

PCT Pub. Date: Dec. 10, 1998

(30) Foreign Application Priority Data

Jun. 4, 1997 (GB) .............................................. 9711439

(51) Int. Cl.⁷ ............................. A61L 9/01; B01D 47/00
(52) U.S. Cl. ...................... 435/266; 423/230; 423/438; 95/92; 95/139; 95/211
(58) Field of Search .......................... 435/266; 423/226, 423/230, 419.1, 437 R, 438; 95/92, 139, 211

(56) References Cited

FOREIGN PATENT DOCUMENTS

EP            0511719 A2   * 11/1992
WO       WO 9640414    * 12/1996

OTHER PUBLICATIONS

S. Lindskog Carbonic Anhydrase, In: Zinc Enzyme, T.G. Spiro (ed), Wiley–Interscience Publications, John Wiley & Sons, (1983), pp. 77–21).

P.A. Ramachandran and R.V. Chaudhari, Three–Phase Catalytic Reactors, Gordon and Breach Science Publishers, Philadelphia, Introduction, (1983), pp. 1–14.

J.I. Kroschwitz and M. Howe–Grant, Reactor Technology in Encyclopedia of Chemical Technology, fourth edition, vol. 20, John Wiley & Sons, New York, (1996), pp. 1010–1011.

Robert H. Perry, Don W. Green and James O. Maloney Perry's Chemical Engineer's Handbook, Sixth Edition, Section 18: Liquid–Gas Systems, (1984), pp. 18–19 to 18–41.

Robert E. Treybal Mass Transfer Operations, Third Edition, McGraw–Hill, New York. Part–2: Gas–Liquid operations Chap. 6: Equipment for Gas–Liquid Operations pp. 197–217 and Chap. 8 Gas Absorption, (1980), pp.275–341.

\* cited by examiner

*Primary Examiner*—David A. Redding
(74) *Attorney, Agent, or Firm*—Oblon, Spivak, McClelland, Maier & Neustadt, P.C.

(57) ABSTRACT

A process is disclosed for the extraction, production and purification of carbon dioxide gas. The process may also be employed for the production of aqueous and/or organic solutions of bicarbonate ions using a precursor feed stream of gas containing carbon dioxide. The process consists of the countercurrent flushing of a packed tower-type bioreactor with gas containing carbon dioxide and a liquid solvent. The bioreactor contains carbonic anhydrase covalently bound to an inert inorganic support. The carbon dioxide of the gaseous phase diffuses into the liquid phase. The immobilized carbonic anhydrase catalyses the hydration of the carbon dioxide which forms hydrogen and bicarbonate ions. The solution of ions may be employed directly or, alternatively, subjected to an ion-exchange resin to immobilize the bicarbonate ions. The aqueous solution of hydrogen and bicarbonate ions may also be recirculated into a second identical bioreactor, wherein they are catalytically converted to water and carbon dioxide.

9 Claims, 2 Drawing Sheets

PROCESS AND APPARATUS FOR THE TREATMENT OF CARBON DIOXIDE WITH CARBONIC ANHYDRASE

FIELD OF THE INVENTION

The present invention relates generally to a process for the extraction, production and purification of carbon dioxide gas. More particularly, it relates to the use of a biological molecule, namely carbonic anhydrase, to effect the reversible hydration of carbon dioxide. Carbonic anhydrase can be used for the production, purification of carbon dioxide and the products of the hydration reaction, hydrogen and bicarbonate ions. Specifically, the invention relates to a process whereby immobilized carbonic anhydrase contained within a reactor device catalyses the reversible hydration of carbon dioxide. The invention also relates to an apparatus for performing the process. The process may be employed for the production of hydrogen and bicarbonate ions.

BACKGROUND OF THE INVENTION

Carbonic anhydrase (EC 4.2.1.1) is a globular zinc metalloenzyme of molecular mass 30,000. The enzyme was discovered in 1933 and has been the subject of intense scientific investigation. Multiple isoforms have been discovered in plant and animal. The enzyme also exists in plant tissues where it is believed to facilitate the transport of carbon dioxide. Red blood cells contain isoenzymes I and II, which are the most active. Carbonic anhydrase II has the highest molecular turnover number of any known enzyme. One molecule of carbonic anhydrase can hydrate 36,000,000 molecules of carbon dioxide in a period 60 seconds. Physiologically, carbonic anhydrase facilitates the removal of carbon dioxide from the mammalian body. The general enzyme reaction is shown below in equation 1.
Equation 1:

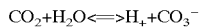

It is stow generally accepted that the reaction occurs as two half reactions shown below in equations 2 and 3.
Equation 2:

Equation 3:

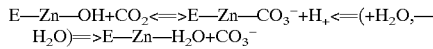

Carbonic anhydrase has been used in many studies directed at improving or testing of various methods of protein immobilization. The high molecular turnover rate of the enzyme renders it an ideal protein for these types of experiments The presence of carbonic anhydrase in solution facilitates the transfer of carbon dioxide from the gas to the liquid phase. This effect is based on the well established laws governing the mass transfer of gases.

The management of carbon dioxide has begun to attract the attention of the scientific community, due primarily to the problem of global warming. Previous interest in carbon dioxide has been centered around the use of the gas in a variety of the processes. None of the currently employed carbon dioxide management systems involve enzymatic conversion of the gas and are therefore not relevant to the present application. Prior art processes for the management of carbon dioxide are described in the following U.S. Pat. Nos. 3,659,400; 3,853,712; 4,032,616; 4,047,894; 4,162,298; 4,452,676; 4,521,387; 4,710,362;. 5,061,455; 5,112,740; 5,609,838; 5,618,506; 5,624,812; 5,565,319; 5,674,463; and 5,690,099.

Also known in prior art, there is the process disclosed in WO 96/40414 in the name of Trachtenberg. Trachtenberg discloses a process for gas separation wherein a selected gas in a mixed gas strew is contacted by an enzyme having an active site directly contacted by the mixed gas stream, and the selected gas is at least partially removed from the mixed gas stream.

EP511719 discloses a process where carbon dioxide is being removed from a gas stream using a enzyme reactor in which carbonic anhydrase is immobilized on a porous substrate.

Moreover, the United States Air Force carried out two investigations in 1965 and 1966 an the possible use of carbonic anhydrase to remove carbon dioxide from space vehicles. The first study explored the absorption of carbon dioxide from an air stream using a closed air loop apparatus. A variety of chemicals alone and/or in combination with CA were evaluated, with respect to their capacity to remove carbon dioxide. The principle conclusion drawn was that the closed air loop system provided an adequate method to study the removal of carbon dioxide from a stream of air. The second study was directed at determining the efficiency of carbon dioxide removal from an air stream using carbonic anhydrase in the presence of various amines. The conclusion reached was that the amine solutions could possibly be used for carbon dioxide absorption and desorption in atmosphere control concepts.

Although many studies relating to the management of carbon dioxide have been conducted in prior art, there is still presently a need for a process and an apparatus that will efficaciously manage carbon dioxide rapidly and at a relatively low cost either for producing carbon dioxide a removing it from a $CO_2$-containing gas.

SUMMARY OF THE INVENTION

An object of the present invention is to propose a process and an apparatus that will satisfy these needs.

In accordance with the present invention, that object is achieved with a process for removing $CO_2$ from a $CO_2$-containing gas, the process being performed in a packed tower bioreactor comprising:

a bottom chamber having a gas inlet and a liquid outlet;

an upper chamber having a liquid inlet and a gas outlet;

a reaction chamber disposed between and being in fluid communication with the bottom chamber and the upper chamber, the reaction chamber being packed with a plurality of solid supports with a non-porous surface on which surface carbonic anhydrase or analogue thereof is immobilised; the process comprising the steps of:

a) supplying the liquid inlet of the upper chamber with an aqueous liquid stream while supplying the gas inlet of the bottom chamber with a $CO_2$-containing gas stream, the gas stream then flowing upwards into the reaction chamber b) directing the aqueous liquid stream downwards into the packed reaction chamber to contact the $CO_2$-containing gas with the aqueous liquid and promote diffusion of the $CO_2$ in the aqueous liquid, and thereby allowing the carbonic anhydrase immobilized in the reaction chamber to catalyze the hydration of the diffused $CO_2$ into hydrogen ions and bicarbonate ions;

c) evacuating from the liquid outlet of the bottom chamber a liquid solution containing the hydrogen ions and bicarbonate ions produced in the reaction chamber and evacuating from the gas outlet of the upper chamber a treated gas.

The present invention is also directed to a process far removing $CO_2$ from a $CO_2$-containing gas, characterized in that it comprises the step of:

a) contacting the $CO_2$-containing gas with an aqueous liquid, preferably water, in a bioreactor containing immobilized carbonic anhydrase, or an analog thereof, the carbonic anhydrase catalysing the hydration of the $CO_2$ into hydrogen ions and bicarbonate ions.

Preferably, prior to step a), there is a step d immobilizing carbonic anhydrase in the bioreactor. The step of immobilizing carbonic anhydrase in the bioreactor may comprise the step of covalently binding carbonic anhydrase to an inert solid support material mounted in the bioreactor. The step a) of contacting the $CO_2$-containing gas with an aqueous liquid comprises the steps of directing a stream of the $CO_2$-containing gas upwards into the bioreactor and directing a stream of the aqueous liquid downwards such that the stream of $CO_2$-containing gas flows countercurrent the stream of the aqueous solution.

According to a first preferred embodiment of the present invention, the process comprises, after step a), step b) of feeding the hydrogen ions and bicarbonate ions obtained in step a) into a second bioreactor containing immobilized carbonic anhydrase which catalyses the conversion of the hydrogen ions and the bicarbonate ions into concentrated $CO_2$ and water.

According to a second preferred embodiment of the invention, the process comprises, after step a), the step of feeding the hydrogen ions and bicarbonate ions obtained in step a) into an ion exchanger containing hydroxyl ions so that the bicarbonate ions are exchanged for the hydroxyl ions which are then free to combine with hydrogen ions to form water.

The present invention also relates to an apparatus for the management of $CO_2$ using immobilized carbonic anhydrase or analog thereof. The apparatus comprises an upright bioreactor.

The bioreactor comprises a bottom chamber having a gas inlet to receive a $CO_2$-containing gas and a liquid outlet to evacuate from the bioreactor a liquid solution containing hydrogen ions and bicarbonate ions produced in the bioreactor. The bioreactor further comprises an upper chamber having a liquid inlet to receive an aqueous liquid and a gas outlet to evacuate any gas from the bioreactor.

A reaction chamber is disposed between and is in fluid communication with the bottom chamber and the upper chamber. This reaction chamber is characterized in that it comprises a plurality of solid supports mounted therein for covalently immobilizing carbonic anhydrase.

In use, the $CO_2$-containing gas is fed through the gas inlet and an aqueous liquid, preferably water, is fed through the liquid inlet. The $CO_2$-containing gas and the aqueous liquid flows through the reaction chamber where carbonic anhydrase therein catalyses the hydration at $CO_2$ thereby forming hydrogen ions and bicarbonate ions. Then, the solution containing the hydrogen ions and bicarbonate ions flows out from the bioreactor via the liquid outlet and the gas free from $CO_2$ flows out via the gas outlet.

According to a first preferred embodiment of the present invention, the apparatus comprises a second bioreactor in series with the upright bioreactor which is hereinafter called a first bioreactor. The second bioreactor is substantially similar to the first bioreactor. It comprises a liquid inlet connected with the liquid outlet of the first bioreactor to receiving the liquid solution from the first bioreactor.

A reaction chamber is provided in order to contain carbonic anhydrase. This reaction chamber is in fluid communication with the liquid inlet and comprises a plurality of inert organic supports mounted therein for covalently immobilizing carbonic anhydrase. The reaction chamber is in fluid communication with a gas outlet to evacuate a gas containing carbon dioxide obtained in the chamber.

A liquid outlet is in fluid communication with the reaction chamber to evacuate water obtained in the reaction chamber The second the preferably comprises means for controlling a pressure in the reaction chamber of the second bioreactor.

According to a second preferred embodiment of the present invention, the apparatus further comprises an ion exchanger having an inlet for receiving the liquid solution from the bioreactor.

The present invention is also directed to the use of carbonic anhydrase or analog thereof covalently immobilized in a bioreactor to remove carbon dioxide from a $CO_2$-containing gas, a to produce hydrogen and bicarbonate ions, a to the use of carbonic anhydrase or analog thereof covalently immobilized in a bioreactor to produce $CO_2$ from enriched solutions of hydrogen: and bicarbonate ions.

A non restrictive description of preferred embodiments will now be given with reference to the appended drawings.

DESCRIPTION OF PREFERRED EMBODIMENTS

During the course of investigating possible uses of carbonic anhydrase for managing carbon dioxide accumulation in submarines, it was noted that covalent immobilization of monomeric enzymes could result in a functional enzyme system of increased stability. Moreover, there has been a dramatic increase in the use of immobilized enzymes in a wide variety of biotechnological applications. Thus, it was reasoned that a bioreactor employing covalently immobilized carbonic anhydrase would provide an efficient biologically based system to manage carbon dioxide.

Figure 1:
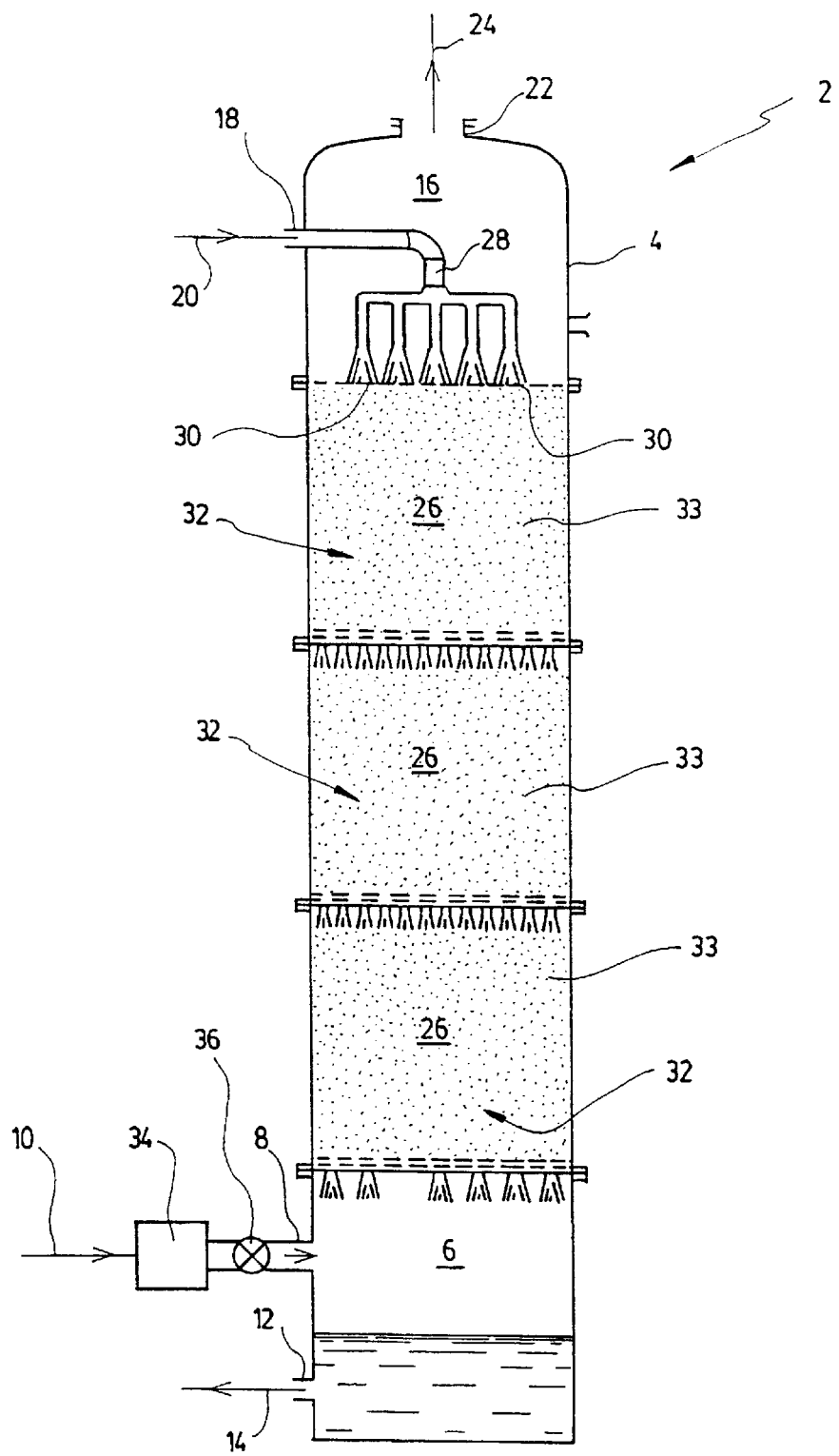
FIG. 1 is a cross-section elevation view of a tower-type bioreactor according to a preferred embodiment of the present invention.

Referring to FIG. 1, an apparatus (2) for the management of $CO_2$ according to a first preferred embodiment of the present invention is illustrated. This apparatus (2) is devised primarily to extract or remove carbon dioxide from a $CO_2$-containing gas and specifically transform this gas to hydrogen and bicarbonate ions. The apparatus (2) comprises an upright bioreactor (4) to contain carbonic anhydrase therein. The bioreactor (4) comprises a lower chamber (6) having a gas inlet (e) to receive a $CO_2$-containing gas (10) and a liquid outlet (12) to evacuate from the bioreactor (4) a liquid solution (14) containing hydrogen ions and bicarbonate ions produced in the bioreactor (4). The bioreactor (4) further comprises an upper chamber (16) having a liquid inlet (10) to receive an aqueous liquid (20) and a gas outlet (22) to evacuate any gas (24) from the bioreactor (4).

A reaction chamber (26) is disposed between the lower chamber (8) and the upper chamber(16). As can be appreciated, the reaction chamber (26) of the bioreactor (4) illustrated is preferably divided in three sub-chambers. The reaction chamber (26) is in fluid coon with the lower chamber (6) and the upper chamber (16). Preferably, the liquid inlet (18) the upper chamber (16) is connected to a pipe system (28) enclosed therein and having at least one liquid outlet (30) into the reaction chamber (26) such that the aqueous liquid (20) entering the bioreactor (4) flows directly into the reaction chamber (26) The reaction chamber (26) has a lower surface permeable to gas and liquid such that the stream of $CO_2$-containing gas entering the bioreactor (4) from the lower chamber (8) flows upwards into the reaction chamber (26) and the liquid in the reaction chamber (26) flows downwards towards and into the tower chamber (6).

The reaction chamber (26) is characterized in that it comprises a plurality of inert supports, schematically represented in FIG. 1 as numeral reference (32), mounted therein for covalently immobilizing carbonic anhydrase (33). These supports (32) are preferably made of ceramic such as silica, namely silica burl saddles the they may be made of polymer such as nylon, polystyrene a polyethylene. The immobilization technique preferably uses one of the following bonding agents: imidocarbonate (silicon), carbondiimide (silica and nylon) and imine (silica and nylon). The polystyrene, nylon polyethylene may be chemically modified with nitric acid to increase covalent bounding with the amine groups of the enzyme.

The $CO_2$-containing teed gas (10) may consist of ambient air or any gaseous mixture containing carbon dioxide. The gas (10) may be filtered through a conventional filtering means (34) known in the art to concentrate the carbon dioxide and/or remove physical impurities. Control means for controlling the $CO_2$-containing gas flow (10) the gas inlet (8) is provided. Thus, the gas (10) is then fed into the tower portion (6) of the bioreactor body (4) using preferably an appropriate valve system (36) for volume and input velocity control. The bioreactor (4) is constructed as a packed tower, a classical design used in numerous applications.

Packed towers are used to contact a gas phase and a liquid phase in order that a gas in the gas phase is absorbed by the liquid phase. Packed towers are used to achieve appropriate mass transfer operations with a minimum expenditure of energy and cost. Packings are used in packed towers to have optimum mass transfer between the gas and liquid phases. Packings are solid supports having different forms, geometry and sizes and made of different materials. They are used to increase contact area between gas and liquid phase end thus to increase mass transfer between gas and liquid phases. Common packings are Raschig rings. Berl saddles, Intalox metal, Intalox saddles, Pall rings, . . . They can be made of polymer, ceramic, metal, . . .

The preferably filtered aqueous or organic solvent (20) enters the bioreactor (4) from the upper chamber (16) and flows downwards either by gravity a pressure controlled Ping. In the reaction chamber (28), as the carbonic anhydrase transforms the gas into hydrogen and bicarbonate ions. The resulting liquid solution (14) of ions leaves the bioreactor (4) for subsequent use. The unique aspect of the invention is the use of carbonic anhydrase as a means to produce enriched solutions of bicarbonate ions. There are several important variations possible with respect to the configuration of the bioreactor (4). The composition of the input gas the (10) may be varied along with the volume and speed of the delivery. The bioreactor (4) may be deployed as a closed system so that the feed gas (10) can be compressed and/or enriched to enhance the kinetics of the mass transfer of the carbon dioxide from the gas to the liquid phase. There is a large number of methods which may be employed to optimize the gas-liquid interaction in the reaction chamber (26), and hence the diffusion of carbon dioxide. The composition (e.g., pH) of the resulting ion solution may be modified according to need. This configuration can serve to extract carbon dioxide from a gas stream to produce a gas or gas mixture free of carbon dioxide.

Figure 2:
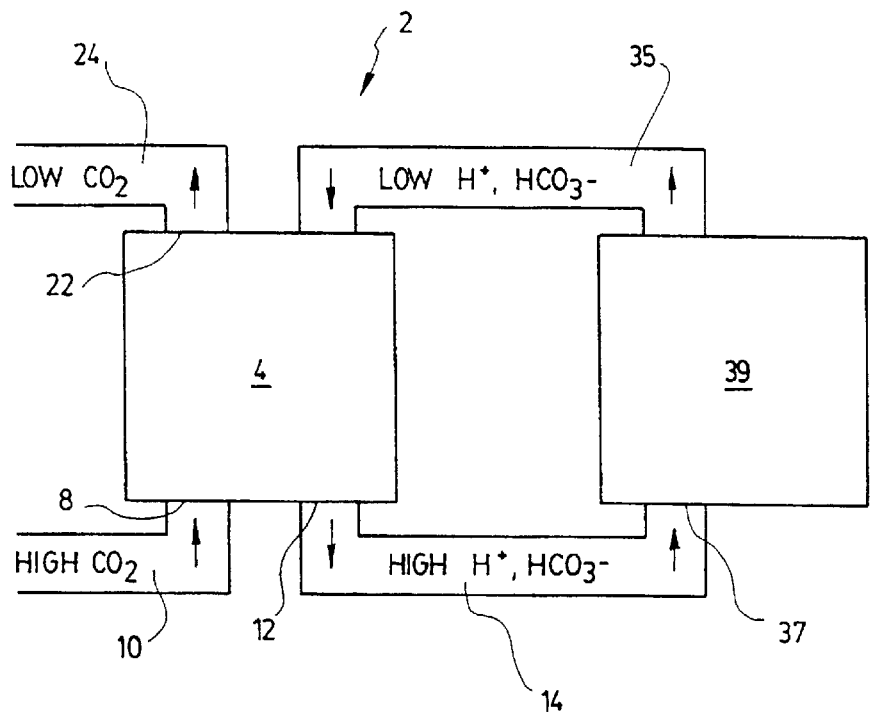
FIG. 2 is a schematic flow chart of a first preferred embodiment of the process according to the present invention.

Referring to FIG. 2, this first bioreactor (4) design may preferably be coupled to an anion exchange system (39) with the resin in the hydroxide form. The ion exchanger (39) has an inlet (37) for receiving the liquid solution (14) from the bioreactor (4). Since the carbon dioxide hydration reaction produces hydrogen and bicarbonate ions in equimoler quantities, this solution may be fed directly into the ion exchange system (37). The bicarbonate ions will be exchanged for the hydroxyl ions which will be free to combine with the hydrogen ions to form water. This system could be deployed as a carbon dioxide management system in arty closed space such as a submarine. As illustrated in FIG. 2, the solution (35) impoverished in hydrogen and bicarbonate ions may be recycled in the bioreactor (4).

Figure 3:
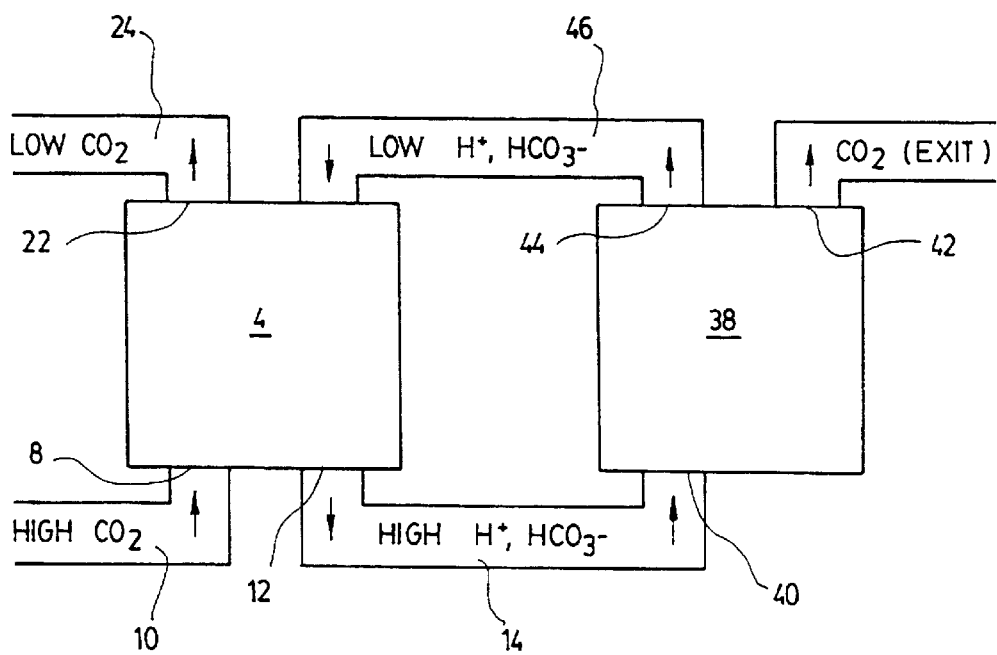
FIG. 3 is a schematic flow chart of a second preferred embodiment at the process according to the present invention.

Referring to FIG. 3, the apparatus (2) for the management of carbon dioxide may further comprise a second bioreactor (38) similar to the first one and connected in series therewith. This particular configuration operates as a closed system. This system serves to produce carbon dioxide and operates in a manner similar to the individual bioreactor design of FIG. 1. The liquid solution (14) containing a relatively high concentration of hydrogen and bicarbonate ions produced in the first bioreactor (4) is fed to the second bioreactor (38) in which carbon dioxide is formed in the reaction catalysed by the carbonic anhydrase. This removal of the gas from the aqueous phase may be enhanced by the application of a slight (i.e., 7–9 mm Hg) negative pressure. The concentrated carbon dioxide can then be recovered for subsequent use.

Since this second bioreactor (38) is similar to the first one, it is schematically illustrated as a box in FIG. 3. This second bioreactor (38) comprises a liquid inlet (40) connected with the liquid outlet (12) of the first bioreactor (4) for receiving the liquid solution (14) from the first bioreactor (4). The second bioreactor (38) comprises a reaction chamber similar to the reaction chamber (26) of the first bioreactor (4) to contain the carbonic anhydrase. The reaction chamber is in fluid communication with the liquid inlet (40) and comprises a plurality of supports therein for covalently immobilizing carbonic anhydrase. A gas outlet (42) is in fluid communication with the reaction chamber to evacuate carbon dioxide obtained in the chamber. A liquid outlet (44) is in fluid communication with the react ion chamber to evacuate water (46) containing a small amount of hydrogen and bicarbonate ions obtained in the reaction chamber. The second bioreactor (38) may preferably comprise means for controlling a pressure in the reaction chamber.

As can be appreciated, the process and apparatus according to the present invention may be used for the extraction, production and purification of carbon dioxide gas. The process may also be employed for the production of aqueous and/or organic solutions of bicarbonate ions and hydrogen ions using a precursor feed stream of gas containing carbon dioxide. It could be very advantageous to use such process and apparatus in any closed space such as a submarine.

What is claimed is:

1. A process for removing $CO_2$ from a $CO_2$-containing gas, the process being performed in a packed tower bioreactor comprising:

a bottom chamber having a gas inlet and a liquid outlet;

an upper chamber having a liquid inlet and a gas outlet;

a reaction chamber disposed between and being in fluid communication with the bottom chamber and the upper chamber, the reaction chamber being packed with a plurality of solid supports having a non-porous surface on which surface carbonic anhydrase or an analogue thereof is immobilised; the process comprising the steps of:

a) supplying the liquid inlet of the upper chamber with an aqueous liquid stream while supplying the gas inlet of the bottom chamber with a $CO_2$-containing gas stream, the gas stream then flowing upwards into the reaction chamber;

b) directing the aqueous liquid stream downwards into the packed reaction chamber to contact the $CO_2$ containing gas with the aqueous liquid and promote diffusion of the $CO_2$ in the aqueous liquid, and thereby allowing the carbonic anhydrase immobilised in the reaction chamber to catalyze the hydration of the diffused $CO_2$ into hydrogen ions and bicarbonate ions ;

c) evacuating from the liquid outlet of the bottom chamber a liquid solution containing the hydrogen ions and bicarbonate ions produced in the reaction chamber and evacuating from the gas outlet of the upper chamber a treated gas.

2. The process according to claim 1, comprising, after step c), the step of:

feeding the hydrogen ions and bicarbonate ions obtained in step c) into a second bioreactor containing immobilised carbonic anhydrase which catalyses the conversion of the hydrogen ions and the bicarbonate ions into concentrated $CO_2$ and water.

3. The process according to claim 1, comprising, after step c), the step of:

feeding the hydrogen ions and bicarbonate ions obtained in step c) into an ion exchanger.

4. The process according to claim 3, wherein the ion exchanger contains hydroxyl ions so that the bicarbonate ions are exchanged far the hydroxyl ions which are then free to combine with hydrogen ions to form water.

5. The process according to claim 1, comprising, prior to step a), a step of:

filtering the $CO_2$-containing gas.

6. The process according to claim 1, wherein the aqueous liquid consists of water.

7. The process according to claim 1, wherein the $CO_2$-containing gas flow through the gas inlet is controlled with a valve.

8. Use of a process as defined in claim 1 for the management of $CO_2$ in a closed space.

9. Use according to claim 8, wherein the closed space is a submarine.

* * * * *